United States Patent [19]

Klink et al.

[11] Patent Number: 4,838,509

[45] Date of Patent: Jun. 13, 1989

[54] TILT-ADJUSTABLE SEAT CUSHION FOR A VEHICLE SEAT

[75] Inventors: Josef Klink, Nagold; Ulrich Maier, Sindelfingen, both of Fed. Rep. of Germany

[73] Assignee: Daimler-Benz Aktiengesellschaft, Stuttgart, Fed. Rep. of Germany

[21] Appl. No.: 86,815

[22] Filed: Aug. 19, 1987

[30] Foreign Application Priority Data

Aug. 23, 1986 [DE] Fed. Rep. of Germany ....... 3628685

[51] Int. Cl.⁴ .................... A47C 3/00; F16M 13/00
[52] U.S. Cl. ................................ 248/393; 248/398; 248/419; 297/326
[58] Field of Search ............ 248/398, 371, 394, 397, 248/291, 393, 396, 395, 419, 424; 297/326, 327, 328, 335, 316; 29/469, 526 R

[56] References Cited

U.S. PATENT DOCUMENTS

| | | | |
|---|---|---|---|
| 1,685,770 | 10/1928 | Bowen | 297/326 |
| 1,957,785 | 5/1934 | Knapp | 248/394 |
| 3,819,142 | 6/1974 | DeFusco | 248/397 |
| 4,304,384 | 12/1981 | Cremer et al. | 248/397 |
| 4,339,103 | 7/1982 | Mori et al. | 297/327 X |
| 4,385,743 | 5/1983 | Werner | 248/397 X |
| 4,441,758 | 4/1984 | Fleischer et al. | 248/371 X |
| 4,469,301 | 9/1984 | Chevalier | 248/419 X |
| 4,560,132 | 12/1985 | Wilder | 248/396 |

FOREIGN PATENT DOCUMENTS

| | | | |
|---|---|---|---|
| 2006816 | 6/1979 | Fed. Rep. of Germany | 248/396 |
| 3316618 | 8/1984 | Fed. Rep. of Germany | . |
| 1032551 | 6/1966 | United Kingdom | 248/395 |

Primary Examiner—Ramon S. Britts
Assistant Examiner—Karen J. Chotkowski
Attorney, Agent, or Firm—Barnes & Thornburg

[57] ABSTRACT

In a tilt-adjustable seat cushion for a vehicle seat having an underframe receiving the upholstered seat part, two lateral frame parts for the pivotable bearing of the underframe and a tilt-adjusting mechanism operating between the underframe and the frame parts for the individual adjusting of the front edge of the seat, the manually operated adjusting shaft of the tilt-adjusting mechanism, in order to facilitate the assembly, is disposed in a separate bearing block that, after pre-assembly with the frame parts and the adjusting shaft, is connected with the underframe by screws or clips.

7 Claims, 1 Drawing Sheet

U.S. Patent    Jun. 13, 1989    4,838,509
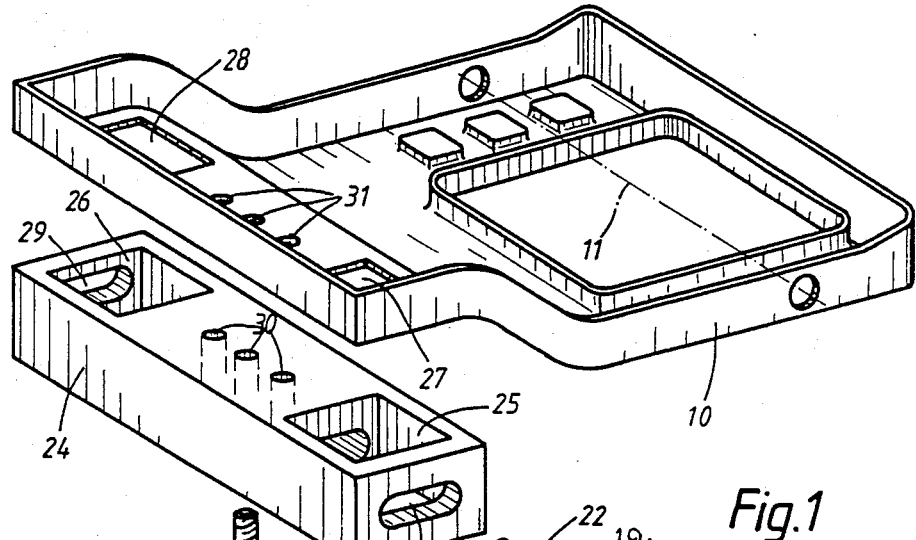
Fig.1
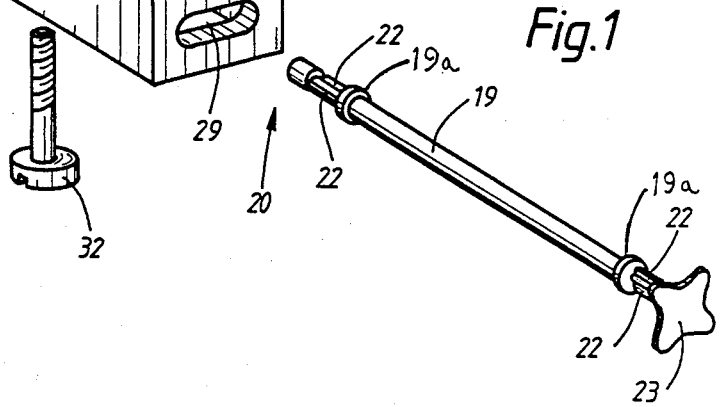
Fig.2
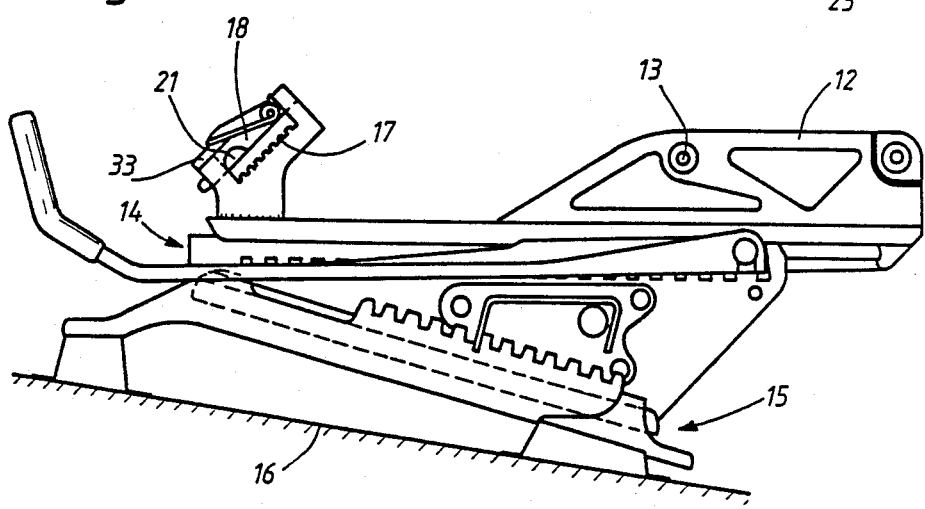

TILT-ADJUSTABLE SEAT CUSHION FOR A VEHICLE SEAT

BACKGROUND AND SUMMARY OF THE INVENTION

The present invention relates to a tilt-adjustable seat cushion for a vehicle seat having an underframe for receiving an upholstered seat part, this seat cushion having two frame parts which are arranged laterally of the underframe. The seat cushion includes a swiveling shaft for the underframe disposed in the frame parts and extends in transverse direction of the vehicle. Each frame part carries at least one row of teeth for interaction with two pinion gear teeth. An adjusting shaft carries the pinion gear teeth and has on one end a handwheel.

In a known seat cushion of the above type, shown in German Published Unexamined patent application No. 3,316,618, the adjusting shaft with the handwheel and the pinion gear teeth is disposed in the underframe and, for this purpose, on both sides, is guided in a respective longitudinal slot in the underframe. The rows of teeth that ascend in the direction of the swiveling shaft of the underframe, penetrate through openings in the floor of the underframe. For assembly, first the underframe is inserted into the frame parts. Then, the adjusting shaft is guided through one longitudinal slot in the underframe, through two recesses in the frame parts, of which one is in each case directly opposite one row of teeth, and then through the other longitudinal slot in the underframe, until two pinion gear teeth engage in the assigned row of teeth.

Because of the tolerances of the underframe and of the components for the tilt adjustment, the above-described assembly is not too easy. However, the assembly becomes significantly more difficult because it can only be carried out at the upholstered seat cushion, in other words, with the seat upholstery part that is firmly connected with the underframe. An objective of the present invention is to significantly facilitate the mounting of the underframe and of the tilt-adjusting mechanism in a seat cushion having an underframe for receiving an upholstered seat part.

This and other objectives are achieved in the present invention by providing a tilt-adjustable seat cushion for a vehicle seat having an underframe for receiving an upholstered seat part, the seat cushion having two frame parts which are arranged laterally of the underframe, swiveling shaft means for the underframe disposed in the frame parts that extends in transverse direction of the vehicle, each frame part carrying at least one row of teeth for interaction with at least two pinion gear teeth, and an adjusting shaft carrying the pinion gear teeth having at one end a hand wheel, with bearing block means. The adjusting shaft is disposed in the bearing block means, this bearing block means being connected to and forming a separate assembly with the frame parts and the adjusting shaft. This separate assembly is then connected with the underframe by fastening means. In certain preferred embodiments, the fastening means are screws or clips.

By disposing the adjusting shaft in a separate bearing block that is separate from the underframe, the tilt-adjusting mechanism comprising the frame part and the adjusting shaft can be assembled completely and only then be connected with the upholstered seat cushion. Because the underframe and the seat upholstery part are absent during the assembly of the tilt-adjusting mechanism, there is more free space and better accessibility so that assembly times are considerably shortened. After the pre-assembly of the tilt-adjusting mechanism is completed, the upholstered underframe is placed without difficulty and connected with the adjusting mechanism.

In certain preferred embodiments, the bearing block or at lest the bearing points of the adjusting shaft in the housing block are made of plastic, to prevent the development of noise caused by rattling, etc.

Other objects, advantages and novel features of the present invention will become apparent from the following detailed description of the invention when considered in conjunction with the accompanying drawings.

BRIEF DESCRIPTION OF THE DRAWINGS

FIG. 1 is a perspective, exploded view of a seat cushion underframe with the bearing block and the adjusting shaft of a tilt-adjusting mechanism in the dismounted condition constructed in accordance with a preferred embodiment of the present invention.

FIG. 2 is a lateral view of a frame part for the holding of the underframe and the tilt-adjusting mechanism in the vehicle constructed in accordance with a preferred embodiment of the present invention.

DETAILED DESCRIPTION OF THE DRAWINGS

For the seat cushion of a motor vehicle seat, FIG. 1 shows only an underframe 10 that is used for receiving a seat cushion that is not shown, this underframe 10 being generally constructed as a cushion bucket. The underframe 10 is pivoted in two frame parts 12 (FIG. 2) arranged laterally of the underframe 10 via a swiveling shaft 11 that extends in transverse direction of the vehicle approximately below the center of gravity of the user of the seat. The swiveling shaft 11 is indicated by a dash-dotted line in FIG. 1. Of the bearing points of the swiveling shaft 11 in the frame parts 12, FIG. 2 shows only bearing point 13 in the frame part 12 that is on the left in forward direction of the vehicle.

The two frame parts 12, only one of which is shown in FIG. 2, are constructed identically. The frame parts 12 support themselves at the vehicle floor 16 via sliding guide means 14, 15 that extend in different planes and are used for sliding the seat longitudinally and vertically. Each frame part 12 carries a row 17 of teeth that ascends in the direction of the swiveling shaft 11 approximately at an angle of 45°. The row 17 of teeth is located at a limiting wall 18 that is provided with a recess 21 for the passing-through of collars 19a of an adjusting shaft 19 of a tilt-adjusting mechanism 20 of the seat cushion.

The adjusting shaft 19, close to its two ends, carries two pinion gear teeth 22 respectively that are located diametrically opposite one another at the adjusting shaft 19. The planes, that are in each case gripped by two pinion gear teeth 22, are twisted with respect to one another around the adjusting shaft 19 by 90°. One end of the adjusting shaft 19 is equipped with a handwheel 23.

For the bearing of the adjusting shaft 19, a bearing block 24 is provided that has two recesses 25, 26 that are each arranged in the area of the pinion gear teeth 22. During assembly, the rows 17 of teeth penetrate through the recesses 25 and 26 and here engage with the pinion gear teeth 22. In order to keep the overall height of the bearing block 24 low, recesses 27, 28 are provided in the underframe 10 or the cushion bucket that correspond with the recesses 25, 26, the rows 17 of teeth being able to partly pass through the recesses 27, 28 when the tilt is adjusted. The adjusting shaft 19 is held in a longitudinal bore 29 with an oval cross-section of the bearing block 24. In certain preferred embodiments, in order to avoid clattering noises, the longitudinal bore 29 is coated with plastic. However, it is also contemplated to construct the whole bearing block 24 of plastic in other preferred embodiments.

For the connection of the bearing block 24 and the underframe 10, passage holes 30 are provided in the bearing block 24 and threaded holes 31 are provided in the underframe 10 that are in alignment with said passage holes 30. In certain preferred embodiments, the bearing block 24 and the underframe 10 are screwed together by fastening screws 32 that are guided through the passage holes 30.

For the mounting of the vertically adjustable seat cushion, the tilt-adjusting mechanism 20 is first connected with the frame parts 12. For this purpose, the bearing block 24 is placed onto the two frame parts so that in each case one row 17 of teeth penetrates through the recesses 25, 26 in the bearing block 24. Then the adjusting shaft 19 is guided through the longitudinal bore 29, in which case the cams 19a must be fitted through the openings 21 in the limiting walls 18 of the frame parts 12. Then the adjusting shaft 19 is aligned so that of one pair of pinion gear teeth 22, both pinion gear teeth 22 engage in the assigned row 17 of teeth, and of the other pair of pinion gear teeth 22, only one pinion gear tooth 22 engages into the assigned row 17 of teeth. In this aligned position, the adjusting shaft 19 is held at the limiting walls 18 by brackets 33. Thus, the tilt-adjusting mechanism 20 is completely mounted. Now the finished upholstered underframe 10 is inserted into the two frame parts 12 and its swiveling shaft 11 is inserted into the bearing points 13. In the illustrated preferred embodiment, the front end of the underframe 10 is screwed to the bearing block 24 by the fastening screws 32.

The method of operation of the above-described tilt-adjusting mechanism 20, when the seat cushion is completely mounted, is described in detail in German Published Unexamined patent application No. 3,316,618, incorporated herein by reference.

The invention is not limited to the above-described embodiment. In an alternate preferred embodiment, the connection of the bearing block 24 with the underframe 10 takes place by clips 30 and other fastening means instead of by screws.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A tilt-adjustable seat cushion for a vehicle seat having an underframe for receiving an upholstered seat part, and having two frame parts which are arranged laterally of said underframe and swiveling shaft means for said underframe disposed in said frame parts that extends in transverse direction of a vehicle, each said frame part carrying at least one row of teeth for interaction with at least two pinion gear teeth, and an adjusting shaft carrying said pinion gear teeth having, at one end, a handwheel, said seat cushion comprising: a unitary bearing block means in which said adjusting shaft is disposed, said bearing block means being connected to and forming a separate assembly with said frame parts and said adjusting shaft, said separate assembly being connected with said underframe by fastening means.

2. A seat cushion according to claim 1, wherein said bearing block means has bearing points for said adjusting shaft, and at least one of said bearing block means and said bearing points are made of plastic.

3. A seat cushion according to claim 2, wherein said fastening means are screws.

4. A seat cushion according to claim 1, wherein said fastening means are screws.

5. A process for assembling a tilt-adjustable seat cushion for a vehicle seat having an underframe for receiving an upholstered seat part and having two frame parts which are arranged laterally of said underframe and swiveling shaft means for said underframe disposed in said frame parts that extends in transverse direction of a vehicle, each said frame part carrying at least one row of teeth for interaction with at least two pinion gear teeth, and an adjusting shaft carrying said pinion gear teeth having at one end a handwheel, and a unitary bearing block means; said assembly process comprising:

disposing said adjusting shaft in said unitary bearing block means; and pre-assembling a separate assembly including said bearing block means, said frame parts and said adjusting shaft;

fastening said pre-assembled separate assembly to said underframe by fastening means.

6. A seat cushion according to claim 1, wherein said underframe has a plurality of recess means for allowing passage therethrough of said at least one row of teeth when said separate assembly is connected to said underframe by said fastening means.

7. A seat cushion according to claim 2, wherein said underframe has a plurality of recess means for allowing passage therethrough of said at least one row of teeth when said separate assembly is connected to said underframe by said fastening means.

* * * * *